US010221876B1

(12) United States Patent
Brice (10) Patent No.: US 10,221,876 B1
(45) Date of Patent: Mar. 5, 2019

(54) SLIDABLE MOUNT FOR DIVING PLATFORM (71) Applicant: Keith Brice, Lakeport, CA (US)

(72) Inventor: Keith Brice, Lakeport, CA (US)

(*) Notice: Subject to any disclaimer, the term of this patent is extended or adjusted under 35 U.S.C. 154(b) by 0 days.

(21) Appl. No.: 15/449,509

(22) Filed: Mar. 3, 2017

Related U.S. Application Data (60) Provisional application No. 62/389,691, filed on Mar. 7, 2016.

(51) Int. Cl.
| F16B 13/06 | (2006.01) |
| A63K 3/02 | (2006.01) |
| A63B 69/12 | (2006.01) |
| F16M 13/00 | (2006.01) |
| E04H 4/14 | (2006.01) |
| F16M 13/02 | (2006.01) |

(52) U.S. Cl.
CPC ............ *F16B 13/066* (2013.01); *A63B 69/12* (2013.01); *A63K 3/023* (2013.01); *E04H 4/144* (2013.01); *F16M 13/005* (2013.01); *F16M 13/02* (2013.01)

(58) Field of Classification Search
CPC ....... F16B 13/066; A63K 3/023; E04H 4/144; F16M 13/005; F16M 13/02; A63B 69/12
USPC ......... 248/412, 686; 403/374.1, 374.3, 374.4
See application file for complete search history.

(56) References Cited

U.S. PATENT DOCUMENTS

| 2,051,251 | A | * | 8/1936 | Epstein | ............... B60B 33/0002 16/38 |
| 3,194,467 | A | * | 7/1965 | Goonan | ................. B23K 13/00 228/50 |
| 3,523,688 | A | * | 8/1970 | Kinsman | ................... A63B 5/10 482/31 |
| 3,528,691 | A | * | 9/1970 | Matich, Jr. | ............ F16D 1/0888 403/314 |
| 4,480,287 | A | * | 10/1984 | Jensen | ................. H05K 7/1404 361/707 |
| 4,603,758 | A | * | 8/1986 | Pettit | ....................... E04H 4/144 182/106 |
| 4,824,303 | A | * | 4/1989 | Dinger | ...................... F16B 2/14 254/104 |
| D509,277 | S |  | 9/2005 | Morral Gispert | |
| 7,058,994 | B2 |  | 6/2006 | Weimer et al. | |
| 7,543,415 | B2 | * | 6/2009 | Svendsen | ................. A63B 5/10 403/374.4 |
| 8,661,767 | B2 |  | 3/2014 | Svendsen | |

(Continued)

*Primary Examiner* — Muhammad Ijaz
(74) *Attorney, Agent, or Firm* — Entralta P.C.; Justin G. Sanders; Peter D. Weinstein (57) ABSTRACT

The present invention provides for the inserted portion of the mount conduit to be cut at an acute angle, forming interface surfaces on two separated pieces. In its simplest form, the invention separated pieces are drawn together by a threaded shaft secured to but able to rotate structurally within the body of one of the separated pieces so that a threaded connection between the threaded shaft and the body of the other separated piece results in the separated pieces sliding across one another at the cut surfaces. As the two separated pieces are further urged to slide across their interface surfaces, an outside surface at a long side of one of the separated pieces is forced farther from an outside surface of a long side of the other separated piece, so that those long surfaces of the two separated pieces are forced against the inside walls of the receiving piece conduit.

9 Claims, 10 Drawing Sheets

(56) References Cited

U.S. PATENT DOCUMENTS

2004/0063545 A1* 4/2004 Rosenberg ............... A63B 5/10
  482/30
2007/0123392 A1* 5/2007 Hagerty .................. A63B 5/10
  482/30

* cited by examiner

SLIDABLE MOUNT FOR DIVING PLATFORM

This application claims priority to U.S. Provisional Patent Application Ser. No. 62/389,691, entitled "SWIMMERS STARTING BLOCK", filed Mar. 7, 2016. The contents of that provisional application are incorporated, in their entirety, by reference herein.

FIELD OF THE INVENTION

The present invention is broadly directed to a mount of a base of a professional diving platform to a concrete or equivalent surface, especially directed to a very simplified structure for installation and removal of the diving platform from engagement with the concrete surface.

BACKGROUND OF THE INVENTION

Diving platforms for professionals, such those engaged in competitive swimming racing who must dive into a pool from a short distance above it, are well known in the art. U.S. Pat. D509277 discloses a representative diving platform or starting block having a lower support section for connection to a concrete surface at a base plate and connection to the diving platform at a topmost surface of the support section. An alternate form of the same conceptual diving platform is found in US Publication 20130252788, where a housing or body of the support structure in the '277 patent with a base plate is substantially replaced in function with a single rectangular conduit extends downward from an upper expanded metal frame supporting the diving platform. The single rectangular conduit 12 of the '788 application is sufficient, when inserted into a receiving piece fixed in concrete, to support the requirements of the entire diving platform or starting block, where structural elements extend up from a vertical element of square conduit 12 to support diving platform 18. It is well known in the art to simply insert the lowest end of square conduit 12 into a square conduit whose bore is slightly larger than the outside surface of the lowest end of square conduit 12, which has resulted in substantial problems in failure of the entire platform to be stable enough for divers to launch from a secure instead of a wobbling platform. U.S. Pat. No. 7,058,994 attempts, without success, to remedy this problem with stabilizing pegs.

One attempt at solving the well known wobbling problem is found in U.S. Pat. No. 8,661,767, wherein a wedge is used to cause a wedge to be formed between the outside of the square conduit supporting the diving platform and the inside of the square conduit receiving piece. This device cannot be used with round conduits and will eventually loosen with repeated use.

There is a need for a mounting device for a diving platform, such as a starting block of the '277 and '767 patents and the '788 application which is not subject to their disabilities.

SUMMARY OF THE INVENTION

The present invention is provides in internal wedge for the mount conduit inserted into a receiving piece, instead of an external one as shown in the '767 patent.

The present invention provides for the inserted portion of the mount conduit to be cut at an acute angle, forming interface surfaces on two separated pieces. In its simplest form, the invention separated pieces are drawn together by a threaded shaft secured to but able to rotate structurally within the body of one of the separated pieces so that a threaded connection between the threaded shaft and the body of the other separated piece results in the separated pieces sliding across one another at the cut surfaces. As the two separated pieces are further urged to slide across their interface surfaces, an outside surface at a long side of one of the separated pieces is forced farther from an outside surface of a long side of the other separated piece, so that those long surfaces of the two separated pieces are forced against the inside walls of the receiving piece conduit. This "internal" wedge of the invention, as opposed to the externally imposed wedge of the '767 patent, provides a more secure connection for support of the diving platform and competition diver than that of the prior art.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
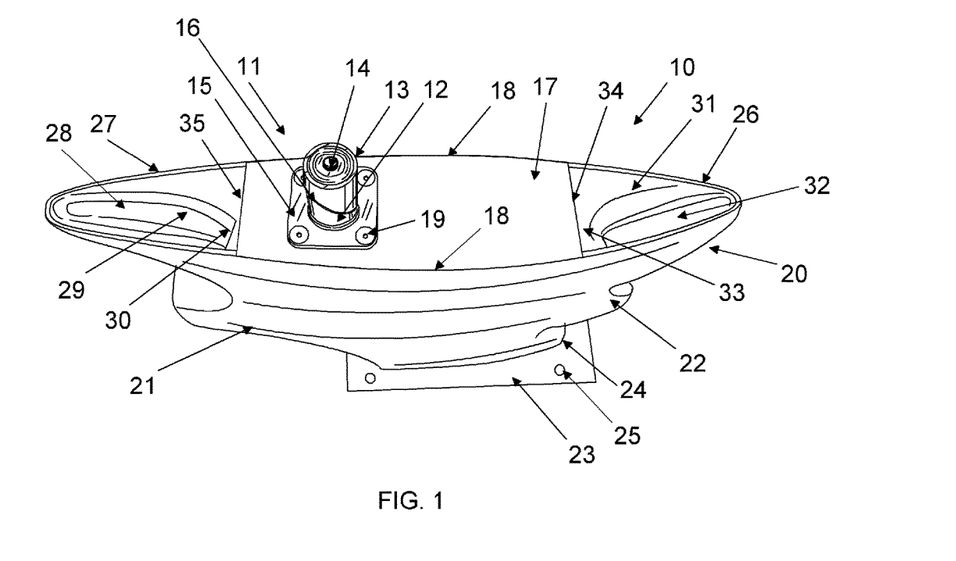
FIG. 1 is a top perspective view of a diving platform having the invention mount fixed to a base plate of the diving platform.

FIG. 1 is a top perspective view of a the bottom of a diving platform 10 having the invention mount device 11 fixed to a base plate 17. A fiberglass shell 20 comprises a hollow shell whose lowest edges 26 and 27 generally define, with base plate 17, the surfaces intended to rest upon a flat concrete surface at poolside. Mount device 11 extends downward from base plate 17 so that all of lower mount conduit 13 and at least a portion of upper mount section 12 are located in a receiver conduit 39 (shown in FIGS. 2 and 3). Openings 30 and 31 are defined respectively by edges 27/35 and edges 26/34. Shell 20 comprises side surfaces 21 and 22 that rise to connect diver's platform connection plate 23, having holes 25 for bolt connections to any of a wide range of diver's platforms available in the prior art. Support plate 17 connects with shell 20 at edges 18. Inside surfaces 28, 29, 32 and 33 show the inside of the fiberglass shell 20. An opening is provided in plate 23 so that, when the diving platform 10 is arranged with the invention mounting device 11 inserted into the receiver conduit, a user can reach through the opening in plate 23 and through shell 20 to reach the top of a bolt 14, whose lowest end is shown in FIG. 1. Upper mount conduit 12 also comprises support plate 15, which is secured to plate 17 by bolts 19. An angled interface 15 is formed between opposing faces of upper mount conduit 12 and lower mount conduit 13. Broken lines show a preferable slot 21a for access from the outside of the fiberglass shell to the top of bolt 14.

Figure 2:
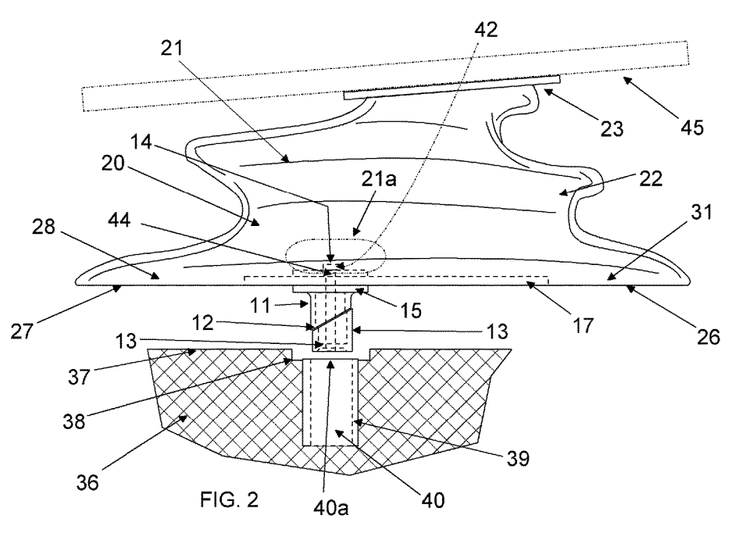
FIG. 2 is a side view of the diving platform of FIG. 1 with the invention mount oriented for insertion into a receiving piece fixed in a solid, typically, concrete, surface.

FIG. 2 is a side view of the diving platform 10 of FIG. 1 with the invention mount device 11 oriented for insertion into a receiving conduit 39 defining a bore 40, where receiving conduit 39 is fixed in a solid, typically, concrete, material 36 and has a top opening 40a. Preferably, cutout 38 is made in material 36 to receive plate 15. Broken lines show additional features of the invention, namely, plate 44 that lies above plate 15 so that joining the two with plate 17 between them secures the invention mounting device to the shell 20. Additionally, bolt 14 is shown joining the three plates 15, 17 and 44 with upper mount piece 12 and lower mount piece 13. Path 42 is generally the direction a user will direct their arm with a rotation tool such as a crescent or boxed end wrench to adjust the top of bolt 14. Broken lines generally indicate a location of a diver's platform 45 that would be attached to plate 23.

Figure 3:
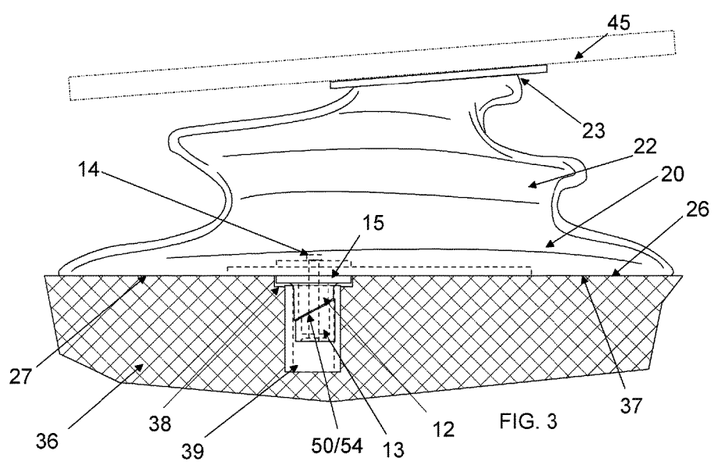
FIG. 3 is a side view of the diving platform of FIG. 2 with the invention mount inserted and securely fixed, according to the invention, into the receiving piece fixed in a solid, typically, concrete, surface.

FIG. 3 is a side view of the diving platform of FIG. 2 with the invention mount 11 inserted and securely fixed, according to the invention, into the receiving conduit 39 in the following general description:

(a) the diving platform comprising a diver's platform supported underneath by a support structure (such as shell 20), such that the mount device extends down from the support structure (such as from base plate 17) and is adapted to engage a receiver conduit (such as receiver conduit 39) having an upward opening (such as opening 40) and is fixed in rigid material (such as material 36) forming a floor about the upward opening;

(b) the mount device comprising an upper mount conduit and a lower mount conduit generally aligned end to end with a common axis, forming an angled interface (such as interface 50/54 of FIG. 23) between the upper mount conduit and the lower mount conduit so that, when the upper conduit piece is urged along the common axis toward the lower conduit piece, long outside surfaces of the upper mount piece and lower mount piece are urged in opposite horizontal directions;

(c) an expansion bolt (such as bolt 14) that extends through bores of and connects the upper mount conduit and lower mount conduit so that rotation means (such as a hexagonal end of bolt 14) connected with the expansion bolt above a top end of the upper mount conduit (such as above and compressing upon an upper surface of plate 44) can be rotated to cause the upper mount piece and lower mount piece to be urged toward each other along their common axis and their long outside surfaces are urged against and engage inside walls of the receiver piece; and (d) the mount device located in the receiver conduit, which is achieved by inserting the lower mount piece and a portion of the upper mount piece into the receiving piece.

Figure 4:
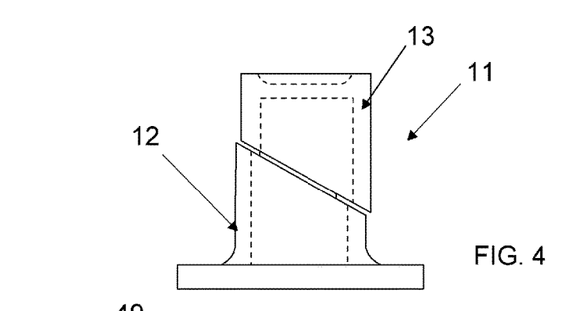
FIG. 4 is side view of the invention mount shown in FIG. 1 with top and bottom pieces.

FIG. 4 is side view of the invention mount shown in FIG. 1 with upper mount conduit 12 and lower mount conduit 13.

Figure 5:
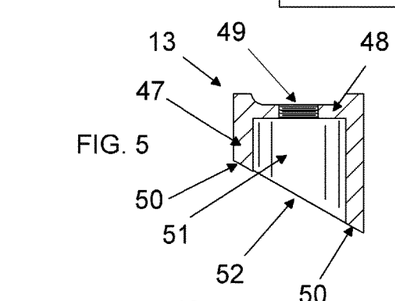
FIG. 5 is a side and cutaway view of lower mount piece, as related to the location of one of the two separate pieces in FIGS. 2 and 3.
Figure 6:
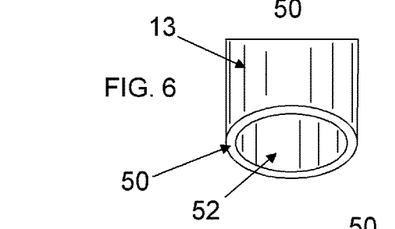
FIGS. 6, 7, 8, 9 and 10 are respectively right, top, front, left, and bottom side views of the lower mount piece, as related to the location of one of the two separate pieces in FIGS. 2 and 3.
Figure 7:
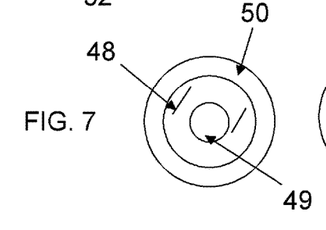
Figure 8:
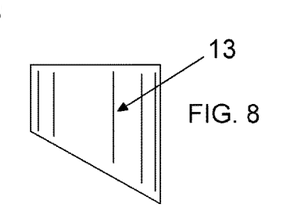
Figure 9:
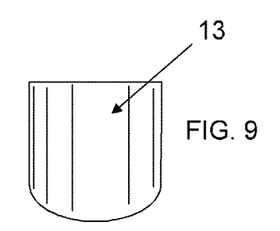
Figure 10:
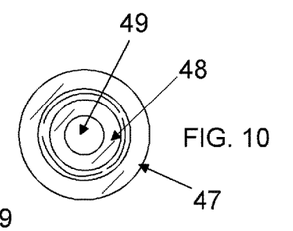

FIG. 5 is a side and cutaway view of lower mount conduit 13, as related to the location of one of the two separate pieces in FIGS. 2 and 3, comprising a cylindrical wall 47 defining an internal space 52 and upper opening 52, which is further defined by lower interface surface 50. Plate 48 is secured to inside walls of wall 47 and defines a threaded bore 49, which is adapted to threadedly engage bolt 14, as shown in FIG. 1. Walls 47 may extend upward or downward from plate 48, depending on requirements of a particular installation for the invention mount device. FIGS. 6, 7, 8, 9 and 10 are respectively right, top, front, left, and bottom side views of the lower mount conduit, as related to the location of one of the two separate pieces in FIGS. 2 and 3.

Figure 11:
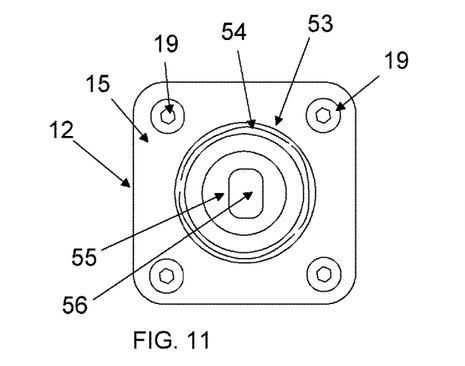
FIG. 11 is a top view of an upper mount piece, as related to the location of one of the two separate pieces in FIGS. 2 and 3 and showing connection bolts for an integral connection plate.
Figure 12:
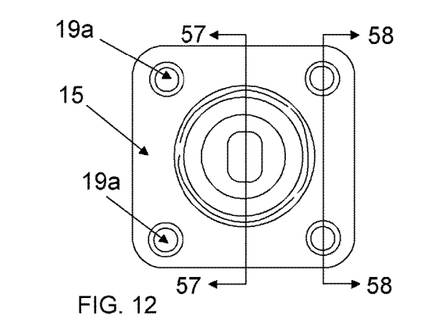
FIG. 12 is a top view of an upper mount piece, as related to the location of one of the two separate pieces in FIGS. 2 and 3 and without connection bolts for an integral connection plate.

FIG. 11 is a top view of an upper mount conduit 12, as related to the location of one of the two separate pieces in FIGS. 2 and 3 and showing connection bolts for an integral connection plate 15. Referring to FIGS. 11 through 17, upper mount conduit 12 comprises cylindrical walls 53 and define an internal space 59 with an opening 60, which is further defined by interface surface 54. Plate 15 extends into and blocks space 59 at plate 55, which defines a bolt slot 56. Bolts 19 are located in countersunk bolt holes 19a to connect plate 15 to plate 44.

Figure 18:
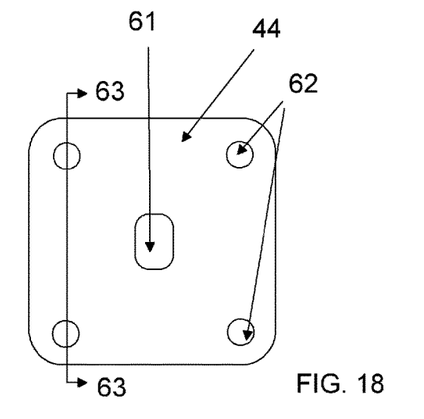
FIG. 18 is a top sandwich plate shown in FIG. 1.
Figure 19:
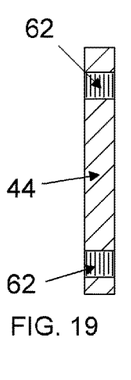
FIG. 19 is section 63 of FIG. 18.

Referring to FIGS. 18 and 19, a top sandwich plate shown 44 in FIG. 1, which comprises threaded bolt holes 62 and a bolt slot 61.

Figure 13:
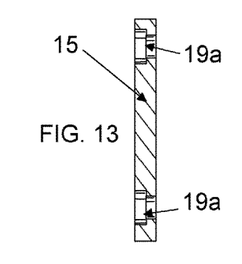
FIG. 13 is section 58 of FIG. 12.
Figure 14:
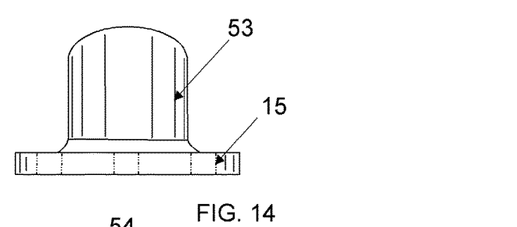
FIG. 14 is left side view of the upper mount piece of FIG. 12 and as shown in FIG. 4.
Figure 15:
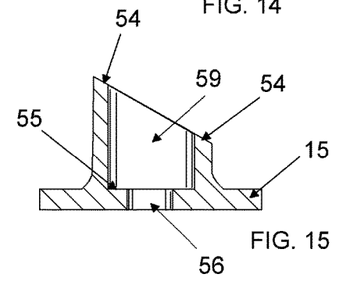
FIG. 15 is section 57 of FIG. 12.
Figure 16:
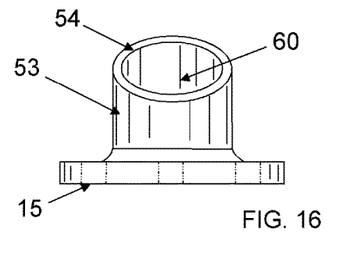
FIG. 16 is a right side view of the upper mount piece of FIG. 11.
Figure 20:
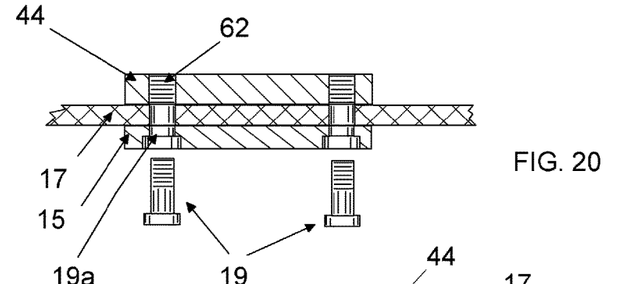
FIG. 20 shows the plate of FIG. 19 and the plate of FIG. 13 in relation to a section of a base plate of the diving platform of FIG. 1 with bolts oriented to engage the three plates.

FIG. 20 shows the plate 44 of FIG. 19 and the plate 15 of FIG. 13 in relation to a section of a base plate 17 of the diving platform of FIG. 1 with bolts 19 oriented to engage the three plates.

Figure 21:
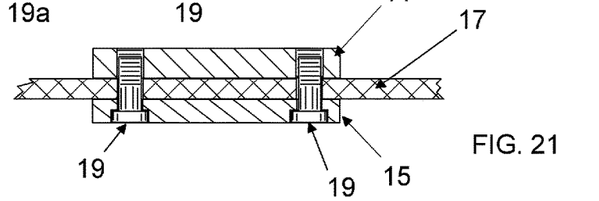
FIG. 21 is the assembly of FIG. 20 with said bolts securing the three plates together.

FIG. 21 is the assembly of FIG. 20 with said bolts 19 securing the three plates 15, 17, and 44 together.

Figure 22:
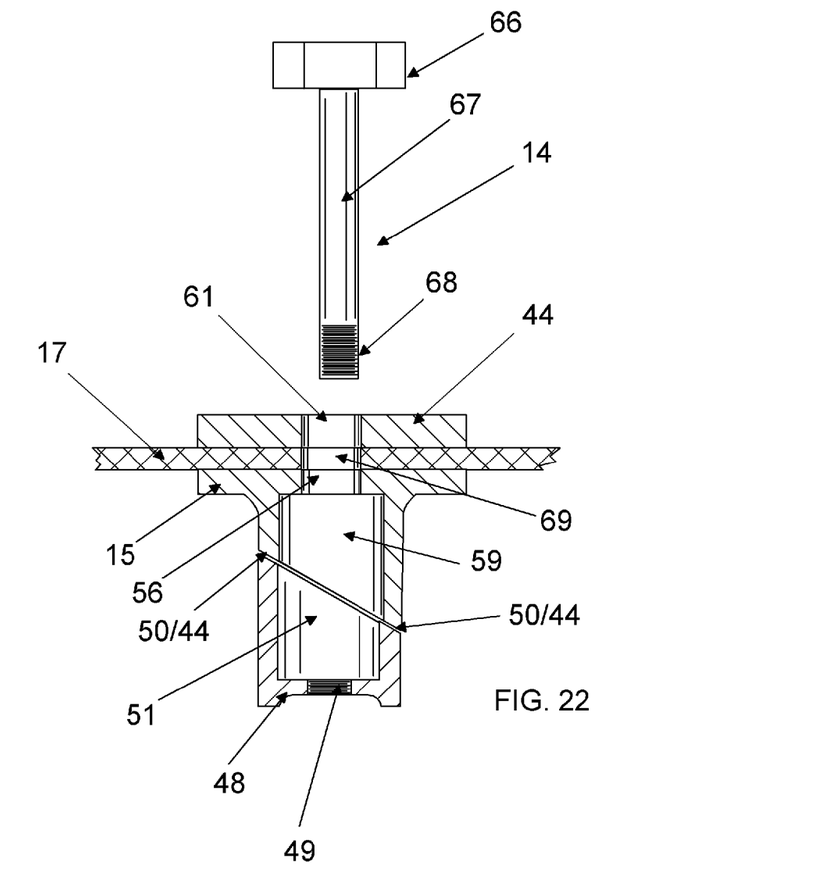
FIG. 22 is an assembly of the plates of FIG. 21 aligning slots in said plates and alignment of the upper and lower mount pieces to all be joined by a threaded bolt.

FIG. 22 is an assembly of the plates 15, 17 and 44 of FIG. 21 aligning slots in said plates and alignment of the upper mount conduit 12 and lower mount conduit 13 to all be joined by a threaded bolt 14, comprising a hexagonal head 66, a shaft 67 and threaded end 68. Angled interface 50/54 is preferably an acute angle of from 80 degrees to 15 degrees, and, more preferably, from 70 degrees to 30 degrees with respect to a generally common axis of upper mount conduit 12 and lower mount conduit 13 as shown.

Figure 23:
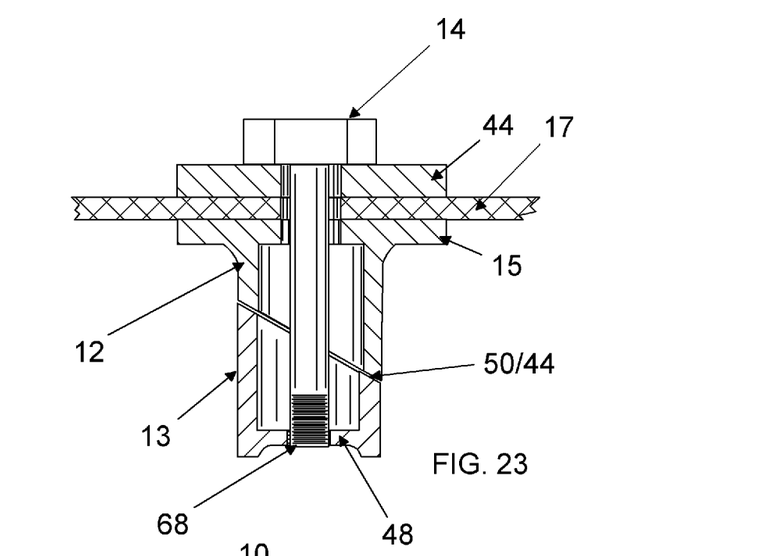
FIG. 23 shows the assembly of FIG. 22 with the threaded bolt joining the three plates and upper and lower mount pieces.

FIG. 23 shows the assembly of FIG. 22 with the threaded bolt 14 joining the three plates and upper and lower mount conduits.

Figure 24:
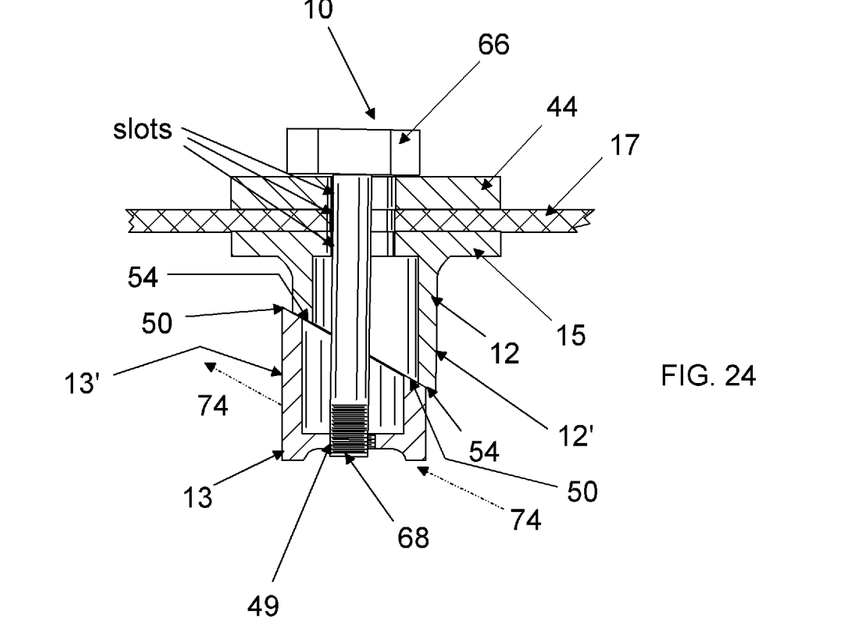
FIG. 24 shows the assembly of FIG. 23 with the threaded bolt urging interface surfaces of the upper and lower mount pieces to slide against each other to force long sides of the upper and lower mount pieces in opposite horizontal directions.

FIG. 24 shows the assembly of FIG. 23 whereby head 66 of threaded bolt 14 has been rotated in a clockwise direction, urging interface surface 54 of the upper mount conduit 12 and the interface surface 50 of the lower mount conduit to slide against each other, generally along path 74, to force long sides 12' of the upper mount conduit 12 and long sides 13' of lower mount conduit 13 in opposite horizontal directions. Bolt 14 is slightly inclined by this action, which inclination is accommodated by the slots in FIG. 24.

Figure 25:
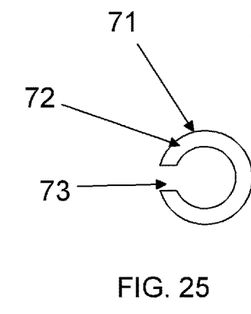
FIGS. 25, 26 and 27 respectively show top, right and left side views of a support insert to be lodged within the internal spaces defined by the inner walls of the upper and lower mount sections.
Figure 26:
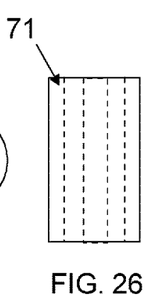
Figure 27:
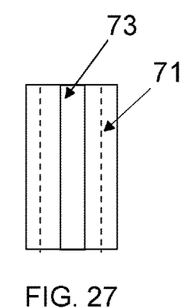

FIGS. 25, 26 and 27 respectively show top, right and left side views of a support insert 71, comprising a cylinder 71 with walls 72 defining longitudinal slot 73 so that the PVC pipe can be compressed as it is lodged within the internal spaces defined by the inner walls of the upper and lower mount conduits.

Figure 28:
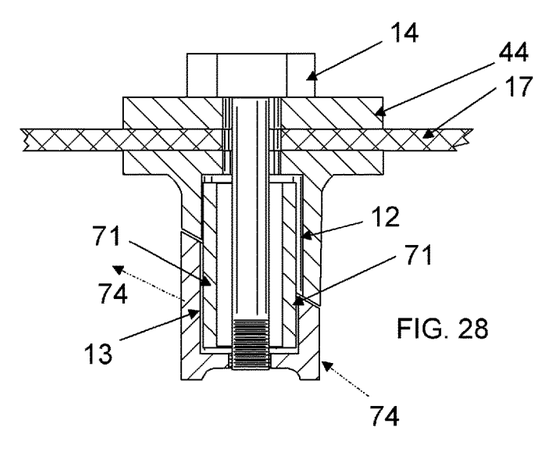
FIG. 28 is the assembly of FIG. 23 showing use of the support insert of FIG. 25.

FIG. 28 is the assembly of FIG. 23 showing use of the support insert 71 of FIG. 25.

Figure 17:
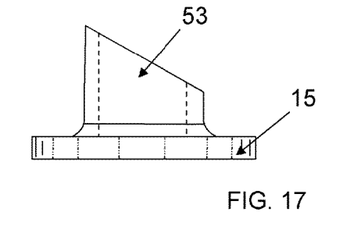
FIG. 17 is a front view of the upper mount piece of FIG. 11.
Figures 29, 30, 31:
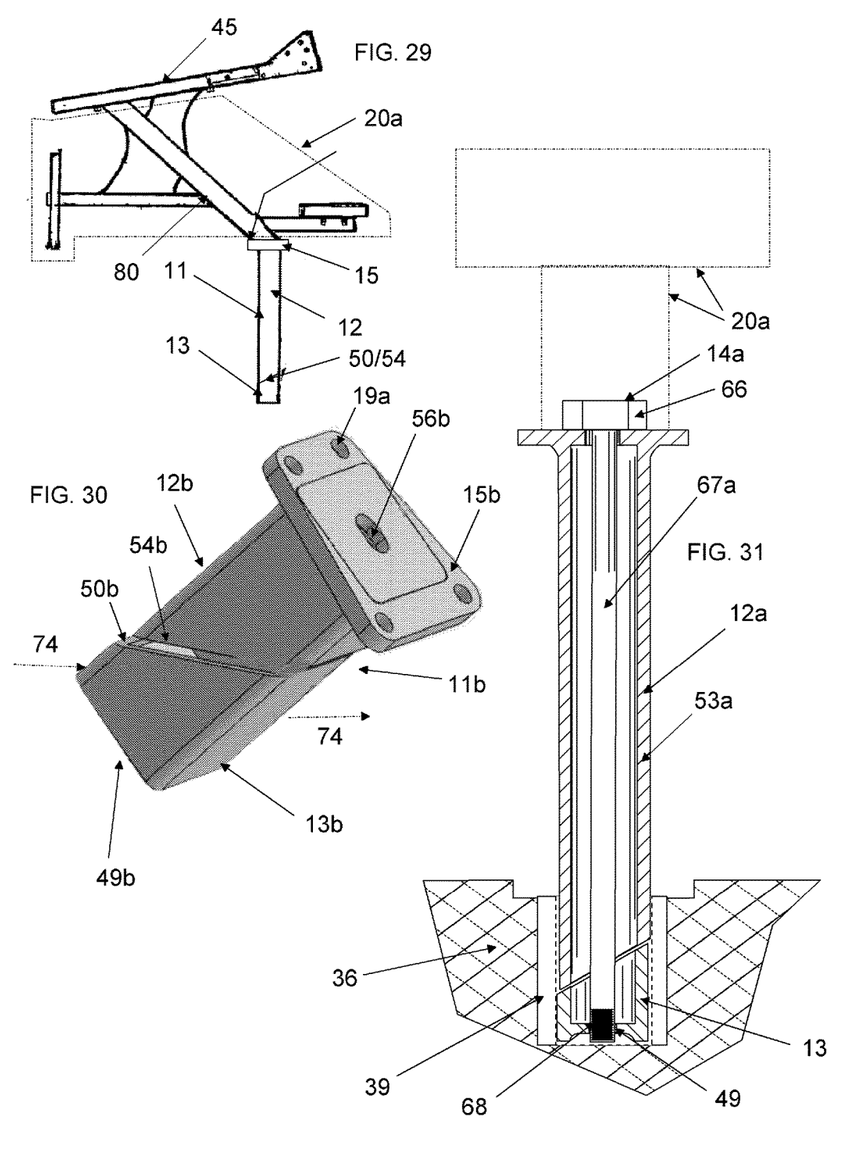
FIG. 29 is a side view of a representative starting block using a single support conduit to support the rest of an intervening frame and inclined diver's platform, whereby an upper mount piece length is extended downward from that shown in FIG. 17 to be adapted to that form of the starting block.
FIG. 30 shows a rectangular conduit form of the invention, similar in structure and function to that shown in FIG. 4.
FIG. 31 is a side and cutaway view of the vertical mounting portion conduit for that embodiment of FIG. 29 for both round, rectangular or polygonal upper and lower mount pieces.

FIG. 29 is a side view of a representative starting block with a diver's platform 54 with a support structure 20a within broken lines, which is structurally equivalent to shell 20, of FIG. 1, using a single support elongated upper mount conduit 12a to support the rest of an intervening frame and inclined diver's platform, whereby an upper mount conduit length is extended downward from that shown in FIG. 17 to be adapted to that form of the starting block. Plate 15 is adapted to be welded to conduit 80 to leave open a top section of plate 15 to provide access to rotation means above plate 15. The conduits of FIG. 29 or of the invention generally may be round, rectangular or polygonal and are preferably steel or stainless steel. In an alternate form of this embodiment angled interface 50/54 may be from side to side relative to the diving platform instead of front to back, as shown in FIG. 29.

FIG. 30 shows a rectangular conduit form of the invention mount device 11b, showing an upper mount conduit 12b having an angled interface surface 54b, an lower mount conduit 13b having an angled interface surface 50b, a support plate 15b with slot 56b, where the end section of lower mount conduit is sealed with a plate similar to that of plate 48 with threaded hole 49 of FIG. 24 receive a threaded end 68 of bolt 14.

FIG. 31 is a side and cutaway view of the vertical mounting portion conduit for that embodiment of FIG. 29 for both round, rectangular or polygonal upper and lower mount conduits, comprising an elongated wall 53 of upper mount conduit 12a, requiring an extension of shaft 67a of bolt 14a.

Figure 32:
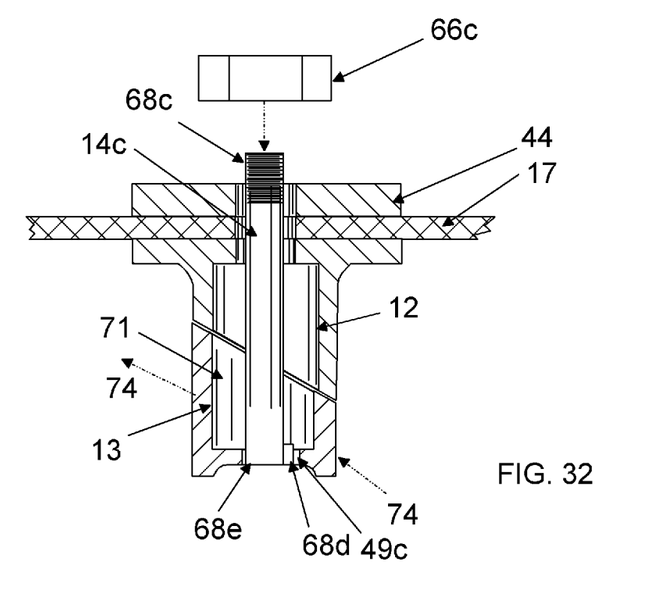
FIG. 32 is an alternate embodiment of the invention similar in structure and function of that shown in FIG. 23, but the bolt is fixed against rotating in the lower mount piece and extends upward with accessible threads at upper end out from a support plate in the upper mount piece.

FIG. 32 is an alternate embodiment of the invention similar in structure and function of that shown in FIG. 23, but the bolt 14c is fixed against rotating in the lower mount conduit 13 by a flange 68d extending from end 68 into notched opening 49c. Bolt 14c then extends upward with accessible threads at upper end 68c above a support plate 15 in the upper mount conduit 12. Threaded nut 66c is applied to threads of upper end 68c, whereby rotating nut 66c in a clockwise direction causes bolt 14c to be drawn upward, urging the interface surfaces of upper mount conduit 12 and lower mount conduit 13 to slide across each other and force their long sides horizontally outward to engage an inside surface of a receiver conduit.

It is within the objects of the invention to provide more than one mount device of the invention for a diving platform. Further, rotation means comprise threaded ends of a bolt to engage with a lower mount conduit or for a threaded connection to a nut or similar device to be made above the upper mount conduit as in FIG. 32.

It is to be understood that while certain forms of the present invention have been illustrated and described herein, it is not to be limited to the specific forms or arrangement of parts described and shown.

What is claimed is:

1. A mount device for securing a swimming starting block to a floor of a pool deck, the starting block comprising a diving platform supported underneath by a support structure, the mount device comprising:

an upper mount conduit configured for being connected to the support structure of the starting block wherein said starting block comprises said diving platform supported underneath by said support structure, the upper mount conduit having an outer diameter or width sized for at least partially extending into an upwardly opening receiver conduit provided by the floor;

a lower mount conduit positioned below the upper mount conduit and having an outer diameter or width sized for being completely positioned within the receiver conduit;

an expansion bolt having a shaft that extends through a respective substantially coaxially aligned bore of the upper mount conduit and the lower mount conduit, each of the bores having a diameter that is relatively larger than a diameter of the shaft;

the upper mount conduit and lower mount conduit being generally aligned end to end with a common axis, forming an angled interface between the upper mount conduit and the lower mount conduit along with opposing long outside surfaces of each of the upper mount conduit and lower mount conduit; the upper mount conduit and lower mount conduit cooperating to define an internal space therebetween; and a resilient, selectively collapsible support insert frictionally positioned within the internal space for interconnecting the upper mount conduit and lower mount conduit;

whereby, upon tightening the expansion bolt, the lower mount conduit is urged along the common axis toward the upper mount conduit, such that the opposing long outside surfaces of the upper mount conduit and lower mount conduit are urged in opposite, substantially horizontal directions, thereby creating a frictional engagement with an inside wall of the receiver conduit.

2. The mount device of claim 1, wherein the angled interface is from 30 to 75 degrees relative to the generally common axis.

3. The mount device of claim 1, wherein the upper mount conduit and lower mount conduit are, in horizontal cross section, round, square or polygonal.

4. The mount device of claim 1, further comprising a rotation means connected with the expansion bolt above a top end of the upper mount conduit, the rotation means capable of being selectively rotated for causing the lower mount conduit to be urged along the common axis toward the upper mount conduit.

5. The mount device of claim 4, wherein the rotation means comprises a head of the expansion bolt that causes rotation of a threaded shaft of the expansion bolt, whereby threads of the shaft are engaged with a threaded bore in the lower mount conduit.

6. The mount device of claim 4, wherein the rotation means comprises a threaded shaft of the expansion bolt fixed against rotation in the lower mount conduit and extending upward through and above a top, distal end of the upper mount conduit, whereby threads of the shaft are engaged by a threaded nut.

7. The mount device of claim 1, wherein an upper end of the upper mount conduit provides a support plate configured for being rigidly connected to the support structure of the starting block.

8. The mount device of claim 7, wherein the support plate is sized for being received within a corresponding cutout in the floor of the pool deck, thereby allowing a top surface of the support plate to be substantially flush with the floor.

9. The mount device of claim 1, wherein the support insert provides a longitudinal slot positioned and configured for assisting the support insert in selectively collapsing as the opposing long outside surfaces of the upper mount conduit and lower mount conduit are urged in opposite, substantially horizontal directions.

* * * * *